(12) United States Patent
Zhang et al.

(10) Patent No.: US 10,976,635 B2
(45) Date of Patent: Apr. 13, 2021

(54) ELECTRONIC PAPER DISPLAY APPARATUS AND PRODUCTION METHOD AND DRIVING METHOD THEREOF

(71) Applicants: BOE Technology Group Co., Ltd., Beijing (CN); Chengdu BOE Optoelectronics Technology Co., Ltd., Chengdu (CN)

(72) Inventors: Jingang Zhang, Beijing (CN); Fucheng Yang, Beijing (CN); Wenchu Han, Beijing (CN); Zihe Zhang, Beijing (CN)

(73) Assignees: BOE TECHNOLOGY GROUP CO., LTD., Beijing (CN); CHENGDU BOE OPTOELECTRONICS TECHNOLOGY CO., LTD, Chengdu (CN)

( * ) Notice: Subject to any disclaimer, the term of this patent is extended or adjusted under 35 U.S.C. 154(b) by 0 days.

(21) Appl. No.: 16/214,927

(22) Filed: Dec. 10, 2018

(65) Prior Publication Data
US 2019/0285962 A1    Sep. 19, 2019

(30) Foreign Application Priority Data
Mar. 14, 2018  (CN) .......................... 201810211666.X

(51) Int. Cl.
*G09G 3/34* (2006.01)
*G02F 1/1676* (2019.01)
*G02F 1/167* (2019.01)

(52) U.S. Cl.
CPC ............ *G02F 1/1676* (2019.01); *G02F 1/167* (2013.01); *G09G 3/344* (2013.01); *G09G 3/3446* (2013.01)

(58) Field of Classification Search
CPC .... G02F 1/167; G02F 1/1676; G02F 1/16766; G09G 3/3433; G09G 3/344; G09G 3/3446; G09G 3/3453; G09G 2300/08
(Continued)

(56) References Cited

U.S. PATENT DOCUMENTS

| 6,879,430 B2 * | 4/2005 | Machida .............. G02B 26/026 |
| | | 359/296 |
| 7,053,410 B2 | 5/2006 | Kurashina et al. |

(Continued)

FOREIGN PATENT DOCUMENTS

| CN | 1257428 C | 5/2006 |
| CN | 102141712 A | 8/2011 |

(Continued)

OTHER PUBLICATIONS

First Office Action, including Search Report, for Chinese Patent Application No. 201810211666.X, dated Aug. 5, 2020, 17 pages.

*Primary Examiner* — Jason M Mandeville
(74) *Attorney, Agent, or Firm* — Westman, Champlin & Koehler, P.A.

(57) ABSTRACT

There is provided an electronic paper display apparatus and a production method and a driving method thereof. The electronic paper display apparatus has: a first electrode layer and a thin-film transistor array layer, which are opposite; an electronic paper ink layer, which is between the first electrode layer and the thin-film transistor array layer; and a second electrode layer, which is on a side of the thin-film transistor array layer away from the electronic paper ink layer and is configured to be capable of forming an electric field for removing an image of the electronic paper ink layer or resetting the electronic paper ink layer together with the first electrode layer.

18 Claims, 4 Drawing Sheets

(58) Field of Classification Search
USPC .......................................................... 345/107
See application file for complete search history.

(56) References Cited

U.S. PATENT DOCUMENTS

| | | | |
|---|---|---|---|
| 8,848,388 B2 | 9/2014 | Sato | |
| 9,288,895 B2 | 3/2016 | Sato | |
| 9,288,896 B2 | 3/2016 | Sato | |
| 9,332,634 B2 | 5/2016 | Sato | |
| 2003/0058521 A1* | 3/2003 | Kawai | G02F 1/167 359/296 |
| 2004/0141223 A1 | 7/2004 | Kurashina et al. | |
| 2004/0145696 A1* | 7/2004 | Oue | G09G 3/344 349/167 |
| 2006/0215068 A1* | 9/2006 | Nakagawa | G02F 1/136213 349/38 |
| 2009/0015545 A1* | 1/2009 | Kato | G02F 1/16756 345/107 |
| 2010/0007942 A1* | 1/2010 | Oikawa | G02F 1/167 359/296 |
| 2010/0039354 A1* | 2/2010 | Sakamoto | G02F 1/167 345/55 |
| 2010/0157412 A1* | 6/2010 | Lee | G02F 1/167 359/296 |
| 2011/0181532 A1 | 7/2011 | Pan et al. | |
| 2011/0181533 A1 | 7/2011 | Pan et al. | |
| 2012/0224343 A1* | 9/2012 | Sato | G02F 1/1345 361/760 |
| 2014/0211428 A1 | 7/2014 | Sato | |
| 2014/0211429 A1 | 7/2014 | Sato | |
| 2014/0211430 A1 | 7/2014 | Sato | |
| 2015/0185948 A1* | 7/2015 | Chang | G02F 1/16756 345/174 |

FOREIGN PATENT DOCUMENTS

| | | |
|---|---|---|
| CN | 102141854 A | 8/2011 |
| CN | 102654713 A | 9/2012 |
| WO | 2017013973 A1 | 1/2017 |

* cited by examiner

ELECTRONIC PAPER DISPLAY APPARATUS AND PRODUCTION METHOD AND DRIVING METHOD THEREOF

CROSS-REFERENCE TO RELATED APPLICATION

This disclosure claims the priority of Chinese Patent Application No. 201810211666.X filed on Mar. 14, 2018, which is incorporated herein by reference in its entirety.

TECHNICAL FIELD

This disclosure relates to the field of display. Specifically, this disclosure relates to an electronic paper display apparatus and a production method and a driving method thereof.

BACKGROUND ART

In an electronic paper display, electrically charged stained particles are evenly dispersed into a medium solution having a certain viscosity, and electrically charged particulates are subjected to electrophoretic movement by an electric field to generate color display. Since color is displayed by the reflection of external light by colored particles, the display has the effect of normal paper and is well received by readers. Furthermore, since the electronic paper has a bistability effect, contents may be displayed even if power is off. Compared to other types of display devices, it has the significant capacity of power saving. Now, electronic paper display apparatuses have been widely used in fields of electronic readers and wireless electronic labels due to advantages described above. Light, thin, and well-displaying electronic paper display devices are desired by consumers.

However, the display refresh time of conventional electronic paper display devices, particularly electronic paper modules used in the field of electronic shelf labels (ESLs) is usually more than ten seconds, reducing the experience of use. Furthermore, energy consumption of display of electronic paper modules are always required to be reduced by terminal manufacturers to facilitate the elongation of service lives of cells.

SUMMARY OF THE INVENTION

Therefore, it is desirable to provide an electronic paper display apparatus and a production method and a driving method thereof, which may reduce refresh time of display images and/or may reduce energy consumption.

In one aspect, this disclosure provides an electronic paper display apparatus, comprising:

a first electrode layer and a thin-film transistor array layer, which are opposite;

an electronic paper ink layer, which is between the first electrode layer and the thin-film transistor array layer; and a second electrode layer, which is on a side of the thin-film transistor array layer away from the electronic paper ink layer and is configured to be capable of forming an electric field for removing an image of the electronic paper ink layer or resetting the electronic paper ink layer together with the first electrode layer.

According to one embodiment of this disclosure, the electronic paper display apparatus further comprises:

an insulating layer, which is between the second electrode layer and the thin-film transistor array layer, wherein the second electrode layer wire is electrically connected to a second conductive wire in the thin-film transistor array layer via a second electrode layer connection point in the insulating layer. According to another embodiment of this disclosure, the insulating layer has a thickness of 200 nm to 400 nm.

According to another embodiment of this disclosure, the insulating layer comprises silicon nitride, silicon oxide, or a mixture thereof.

According to another embodiment of this disclosure, the second electrode layer connection point has a diameter of 50 μm to 200 μm.

According to another embodiment of this disclosure, the first electrode layer is electrically connected to a first conductive wire in the thin-film transistor array layer via a first electrode layer connection point.

According to another embodiment of this disclosure, the first electrode layer connection point comprises a gold-bead-containing silica gel or silver paste point.

According to another embodiment of this disclosure, the first electrode layer connection point has a diameter of 0.1 mm to 2 mm.

According to another embodiment of this disclosure, the electronic paper display apparatus further comprises: a drive circuit unit, wherein the drive circuit unit is electrically connected to the first electrode layer via a first conductive wire in the thin-film transistor array layer, is electrically connected to the second electrode layer via a second conductive wire in the thin-film transistor array layer, and is electrically connected to a thin-film transistor array in the thin-film transistor array layer via a third conductive wire in the thin-film transistor array layer.

According to another embodiment of this disclosure, the second electrode layer comprises a conductive metal oxide, a metal, or a mixture thereof.

According to another embodiment of this disclosure, the conductive metal oxide is selected from: indium oxide, tin oxide, indium tin oxide, indium zinc oxide, or a mixture of any two or more thereof.

According to another embodiment of this disclosure, the metal is selected from: molybdenum, aluminum, silver, copper, or an alloy or a mixture of any two or more thereof.

According to another embodiment of this disclosure, the second electrode layer has a thickness of 40 nm to 200 nm.

In another aspect of this disclosure, there is provided a method for producing the electronic paper display apparatus of any one described above, comprising the steps of:

forming a second electrode layer;

forming a thin-film transistor array layer on the second electrode layer;

forming an electronic paper ink layer on the thin-film transistor array layer; and forming a first electrode layer on the electronic paper ink layer.

According to one embodiment of this disclosure, the method further comprises:

forming an insulating layer on the second electrode layer and forming a second electrode layer connection point in the insulating layer, after forming the second electrode layer and before forming the thin-film transistor array layer on the second electrode layer, wherein the second electrode layer is electrically connected to a second conductive wire in the thin-film transistor array layer via the second electrode layer connection point.

In another aspect of this disclosure, there is provided a method for driving the electronic paper display apparatus of any one described above, wherein an electric field is formed by applying a voltage to the first electrode layer and the second electrode layer to remove an image of the electronic paper ink layer or reset the electronic paper ink layer.

According to one embodiment of this disclosure, the method comprises the steps of:

an image removing step, which comprises applying a negative voltage to the first electrode layer and applying a positive voltage to the second electrode layer.

According to one embodiment of this disclosure, the method comprises:

a resetting step, which comprises: a resetting sub-step of applying a positive voltage to the first electrode layer and applying a negative voltage to the second electrode layer; and a removing sub-step of applying a negative voltage to the first electrode layer and applying a positive voltage to the second electrode layer.

According to one embodiment of this disclosure, the resetting sub-step and the removing sub-step are alternately repeated several times.

According to another embodiment of this disclosure, the method comprises:

an image displaying step, which comprises: applying a voltage to a pixel electrode via a thin-film transistor array in the thin-film transistor array layer to display an image, wherein no voltage is applied to the second electrode layer.

DESCRIPTION OF DRAWINGS

In order to illustrate the technical solutions in examples of this disclosure more clearly, figures required for describing the examples will be simply introduced below. It is apparent that the figures described below are merely exemplary examples of this disclosure, and other figures may be further obtained by those of ordinary skill in the art according to these figures without exerting inventive work.

DESCRIPTION OF EMBODIMENTS

The technical solutions in the examples of this disclosure will be described clearly and fully below in conjunction with specific embodiments of this disclosure. Obviously, the embodiments and/or examples described are merely a part of the embodiments and/or examples of this disclosure, rather than all of the embodiments and/or examples. Based on the embodiments and/or examples of this disclosure, all other embodiments and/or examples obtained by those of ordinary skill in the art without performing inventive work belong to the scope protected by this disclosure.

In this disclosure, the layer and the film may be interchangeably used, unless specifically indicated. In this disclosure, all characteristics of numeric values mean to be within an error range of measurement, for example within ±10%, within ±5%, or within ±1% of a defined numeric value. Terms "first", "second", "third", and the like are for the purpose of description only, and cannot be understood as indicating or suggesting relative importance or implying the number of technical features indicated. Thereby, a characteristic defined by "first", "second", "third", and the like may expressly or impliedly comprises one or more characteristics.

In one aspect of this disclosure, there may be provided an electronic paper display apparatus, comprising:

a first electrode layer and a thin-film transistor array layer, which are oppositely provided;

an electronic paper ink layer, which is provided between the first electrode layer and the thin-film transistor array layer; and a second electrode layer, which is provided on a side of the thin-film transistor array layer away from the electronic paper ink layer.

The second electrode layer is configured to be capable of forming an electric field for removing an image of the electronic paper ink layer or resetting the electronic paper ink layer together with the first electrode layer. That is, by loading suitable voltages on the first electrode layer and the second electrode layer, an electric field is formed in the electronic paper ink layer to remove an image therein or reset the electronic paper ink layer.

Figure 1:
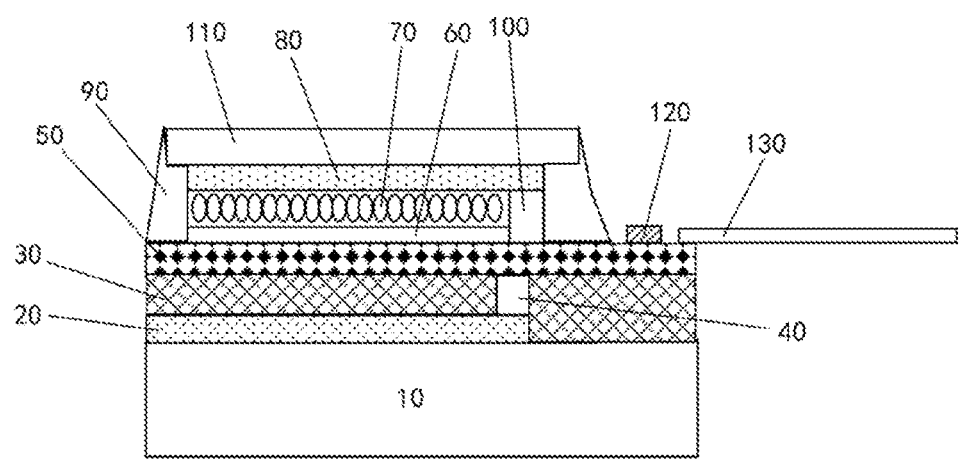
FIG. 1 is a structural schematic diagram exemplarily illustrating an electronic paper display apparatus according to one embodiment of this disclosure.

FIG. 1 is a structural schematic diagram exemplarily illustrating an electronic paper display apparatus according to one embodiment of this disclosure.

As shown in FIG. 1, an electronic paper display apparatus according to one embodiment of this disclosure may comprise: a substrate 10 such as glass substrate or a polyethylene terephthalate substrate, a second electrode layer 20 provided on the substrate 10, an insulating layer 30 provided on the second electrode layer 20, a thin-film transistor array layer 50 provided on the insulating layer 30, an electronic paper ink layer 70 provided on the thin-film transistor array layer 50, and a first electrode layer 80 provided on the electronic paper ink layer 70.

The electronic paper display apparatus may further comprise a first protective film layer 110 provided on the first electrode layer 80.

Optionally, a second encapsulation protective film layer 60 may be provided between the thin-film transistor array layer 50 and the electronic paper ink layer 70. The second encapsulation protective film layer 60 may be transparent or opaque to improve the contrast of image display.

The electronic paper ink layer 70 may comprise a plurality of microcapsules. Each of the microcapsule may comprise a fluid and a plurality of electrically charged particles located in this fluid. A plurality of microcapsule may correspond to one screen pixel.

The thin-film transistor array layer 50 comprises a first zone on which the electronic paper ink layer 70 is provided and a second zone located on a side of the first zone. A first electrode layer connection point 100 is provided on the second zone. As shown in FIG. 1, the second encapsulation protective film layer 60 and the electronic paper ink layer 70 have the same area in the horizontal directions. In FIG. 1, the first electrode layer connection point 100 is provided at the right side of the second encapsulation protective film layer 60 and the electronic paper ink layer 70. However, this disclosure is not limited thereto. For example, it may be provided at the left side of the second encapsulation protective film layer 60 and the electronic paper ink layer 70. A drive circuit unit 120, which controls the directions of the electric fields between the thin-film transistor array layer 50 and the first electrode layer 80 and between the second electrode layer 20 and the first electrode layer 80 to control the distribution of electrically charged particles, is provided in the second zone of the thin-film transistor array layer 50.

A first electrode layer connection point 100, which allows the first electrode layer 80 to be electrically connected to a first conductive wire in the thin-film transistor array layer 50, is further provided between the first electrode layer 80 and the thin-film transistor array layer 50. The drive circuit unit 120 drives and controls the first electrode layer 80 via the first conductive wire.

The second electrode layer 20 may be electrically connected to a second conductive wire in the thin-film transistor array layer 50 via a second electrode layer connection point 40 in an insulating layer 30. The drive circuit unit 120 may drive and control the second electrode layer 20 via the second conductive wire.

In this embodiment, it is to be noted that the first conductive wire and the second conductive wire are in the thin-film transistor array layer. However, they are independent from a thin-film transistor array. They are provided in the thin-film transistor array layer mainly in consideration of simple production and convenient wire leading. The first electrode layer and the second electrode layer may also be connected to a voltage source and a control circuit via other circuits. This is not limited in this disclosure.

The thin-film transistor array layer 50 comprises a thin-film transistor array. The thin-film transistor array is electrically connected to a third conductive wire in the thin-film transistor array layer 50. The drive circuit unit 120 may drive and control the thin-film transistor array via the third conductive wire.

The first conductive wire, the second conductive wire, and the third conductive wire may be formed together with any of the source electrode, the gate electrode, and the drain electrode in the thin-film transistor array from the same material (for example, a metal, a conductive metal oxide) so as to simplify the process.

The drive circuit unit 120 may be connected to a control circuit board via a flexible wiring board 130. The drive circuit unit 120 may be a drive integrated circuit element (IC).

Under the control of the control circuit board, the drive circuit unit 120 controls and changes the directions of the electric fields between the thin-film transistor array layer 50 and the first electrode layer 80 and between the second electrode layer 20 and the first electrode layer 80 to control the distribution of the electrically charged particles so as to display images.

According to some examples, the first electrode layer 80 may be formed from a transparent conductive oxide material. The transparent conductive metal oxide may be selected from: indium oxide, tin oxide, indium tin oxide (ITO), indium zinc oxide, or a mixture of any two or more thereof. For example, the first electrode layer 80 may be an ITO layer.

According to some examples, the first electrode layer connection point 100 may comprise a gold-bead-containing silica gel or silver paste point. The first electrode layer connection point 100 may have a diameter of 0.1 mm to 2 mm.

According to some examples, the second electrode layer 20 may comprise a conductive metal oxide, a metal, or a mixture thereof. The conductive metal oxide may be selected from: indium oxide, tin oxide, indium tin oxide, indium zinc oxide, or a mixture of any two or more thereof. The metal may be selected from: molybdenum, aluminum, silver, copper, or an alloy or a mixture of any two or more thereof. The second electrode layer 20 may have a thickness of 40 nm to 200 nm.

According to some examples, the insulating layer 30 may have a thickness of 200 nm to 400 nm. The insulating layer 30 may comprise silicon nitride, silicon oxide, or a mixture thereof.

According to some examples, the second electrode layer connection point 40 may have a diameter of 50 $\mu$m to 200 $\mu$m. The second electrode layer connection point 40 may be produced together with the first conductive wire, the second conductive wire, and the third conductive wire from the same material, for example a metal or a conductive metal oxide, such as ITO.

The electronic paper display apparatus may further comprise: a sealant 90 provided around the electronic paper ink layer 70. The sealant 90 is provided between the thin-film transistor array layer 50 and the first protective film layer 110. The provision of the sealant 90 has a protective effect of water resistance and moisture resistance on the electronic paper ink layer 70.

Figure 2:
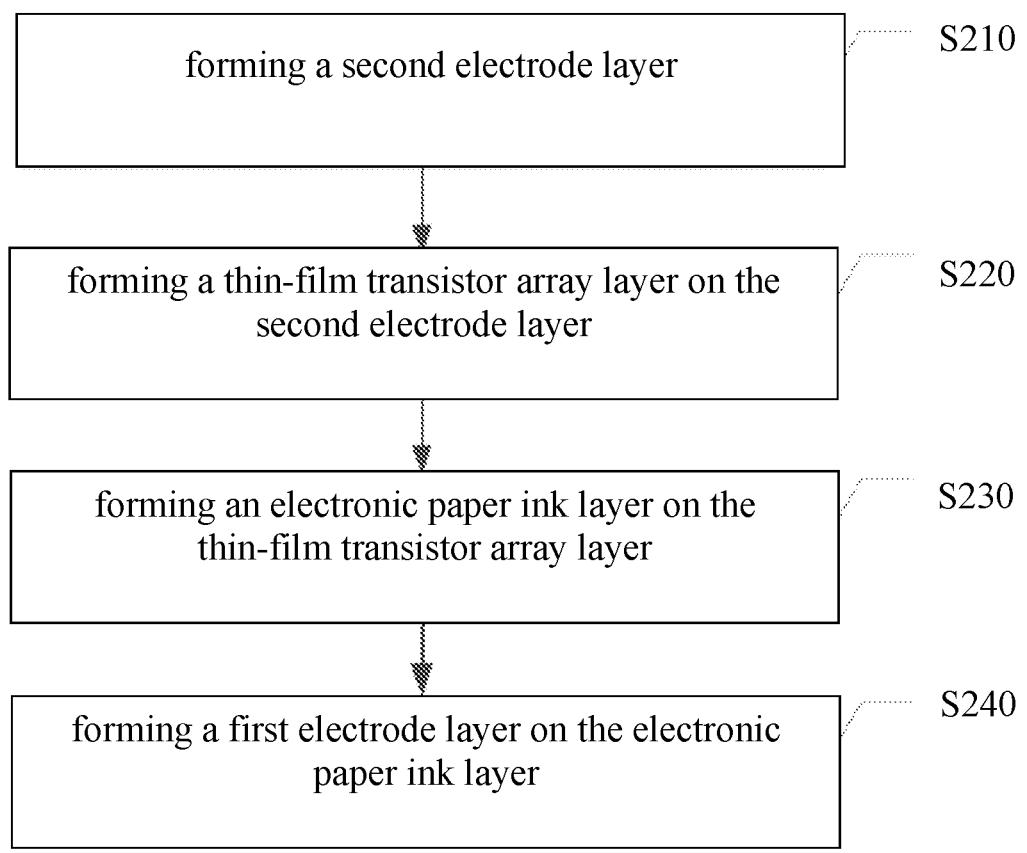
FIG. 2 is a schematic diagram exemplarily illustrating a method for producing an electronic paper display apparatus according to one embodiment of this disclosure.

FIG. 2 is a schematic diagram exemplarily illustrating a method for producing an electronic paper display apparatus according to one embodiment of this disclosure.

As shown in FIG. 2, a method for producing the electronic paper display apparatus of any one described above comprises the steps of:

S210: forming a second electrode layer;

S220: forming a thin-film transistor array layer on the second electrode layer;

S230: forming an electronic paper ink layer on the thin-film transistor array layer; and S240: forming a first electrode layer on the electronic paper ink layer.

The method may further comprise: forming an insulating layer on the second electrode layer and forming a second electrode layer connection point in the insulating layer, after forming the second electrode layer and before forming the thin-film transistor array layer on the second electrode layer, wherein the second electrode layer is electrically connected to a second conductive wire in the thin-film transistor array layer via the second electrode layer connection point.

According to a specific embodiment of this disclosure, in the method for producing the electronic paper display apparatus, a substrate 10 such as glass substrate or a polyethylene terephthalate substrate is provided. A second electrode layer 20, for example an ITO layer having a thickness of 100 nm, is formed on the substrate 10, for example by sputtering (S210). An insulating layer 30, for example a silicon oxide layer having a thickness of 300 nm, is formed on the second electrode layer 20 by CVD film-coating; and a through hole, for example a through hole having a diameter of 100 $\mu$m, is formed in the insulating layer 30.

A thin-film transistor array layer 50 is formed on the insulating layer 30 (S220). The thin-film transistor array layer 50 comprises a thin-film transistor array, a first conductive wire, a second conductive wire, and a third conductive wire. At the same time of forming the second conductive wire, a second electrode layer connection point 40 is formed in the through hole of the insulating layer 30 from a material, which is the same as that of the second conductive wire, such as silver, so that the second electrode layer connection point 40 is electrically connected to the second conductive wire and the second electrode layer 20. The second electrode layer connection point 40 is a connection point having a diameter of 100 $\mu$m and a thickness of 300 nm.

An electronic paper film containing an electronic paper ink layer 70 is attached onto a first zone on the thin-film transistor array layer 50 (S230).

A first electrode layer connection point 100, such as a silver paste point having a diameter of 0.5 mm, is produced on a side of the electronic paper film (i.e., on a second zone on a side of the first zone of the thin-film transistor array layer 50).

A first electrode layer 80 such as a first ITO electrode layer is formed on the electronic paper film (S240), and the first electrode layer 80 is electrically connected to the first electrode layer connection point 100.

A drive circuit unit 120 is bound in the second zone of the thin-film transistor array layer 50, so that the circuit unit is electrically connected to the first electrode layer 80 via the first conductive wire, electrically connected to the second electrode layer 20 via the second conductive wire, and electrically connected to the thin-film transistor array via the third conductive wire.

A flexible wiring board 130 is bound, wherein the drive circuit unit 120 may be connected to a control circuit board via the flexible wiring board 130.

A sealant 90 is applied around the electronic paper ink layer 70.

Optionally, the method for producing the electronic paper display apparatus of any one described above may further comprise a step of providing a first protective film layer 110 on the first electrode layer 80.

Optionally, the method for producing the electronic paper display apparatus of any one described above may further comprise a step of providing a second encapsulation protective film layer 60 between the thin-film transistor array layer 50 and the electronic paper ink layer 70.

In still another aspect of this disclosure, there may be provided a method for driving the electronic paper display apparatus of any one described above, wherein an electric field is formed by applying voltages to the first electrode layer and the second electrode layer to remove an image of the electronic paper ink layer or reset the electronic paper ink layer.

The driving method may comprise an image removing step, a resetting step, and an image displaying step, which are circulated in this order, to display different images in the electronic paper ink layer.

The driving method of this disclosure will be described by an example below. However, the method of this disclosure is not limited thereto. For example, positive and negative voltages of electrodes may be appropriately adjusted according to various properties of electronic paper inks.

In one example, the method comprises the steps of:

an image removing step, which comprises applying a negative voltage to the first electrode layer and applying a positive voltage to the second electrode layer. At this time, voltage may not be applied to a pixel electrode by the thin-film transistor array.

Further, the method may further comprise:

a resetting step after the image removing step, wherein the resetting step comprises: a resetting sub-step of applying a positive voltage to the first electrode layer and applying a negative voltage to the second electrode layer; and a removing sub-step of applying a negative voltage to the first electrode layer and applying a positive voltage to the second electrode layer. At this time, voltage may not be applied to a pixel electrode by the thin-film transistor array.

That is, image removing and image resetting may be subjected to the electronic paper ink layer by the second electrode layer rather than each separate pixel electrode. This may greatly improve refresh speed and performance.

Further, the method may further comprise:

an image displaying step after the resetting step, wherein the image displaying step comprises: applying a voltage to the first electrode layer and outputting the voltage to the electronic paper ink layer by the drive circuit unit, wherein the second electrode layer is hanged up. Voltage changes of the thin-film transistor array and the first electrode layer are controlled by respective output channels of the drive circuit unit to allow the electronic paper ink layer to display corresponding images. In other words, a voltage is applied to a pixel electrode via a thin-film transistor array in the thin-film transistor array layer to display an image, wherein no voltage is applied to the second electrode layer.

Figure 3:
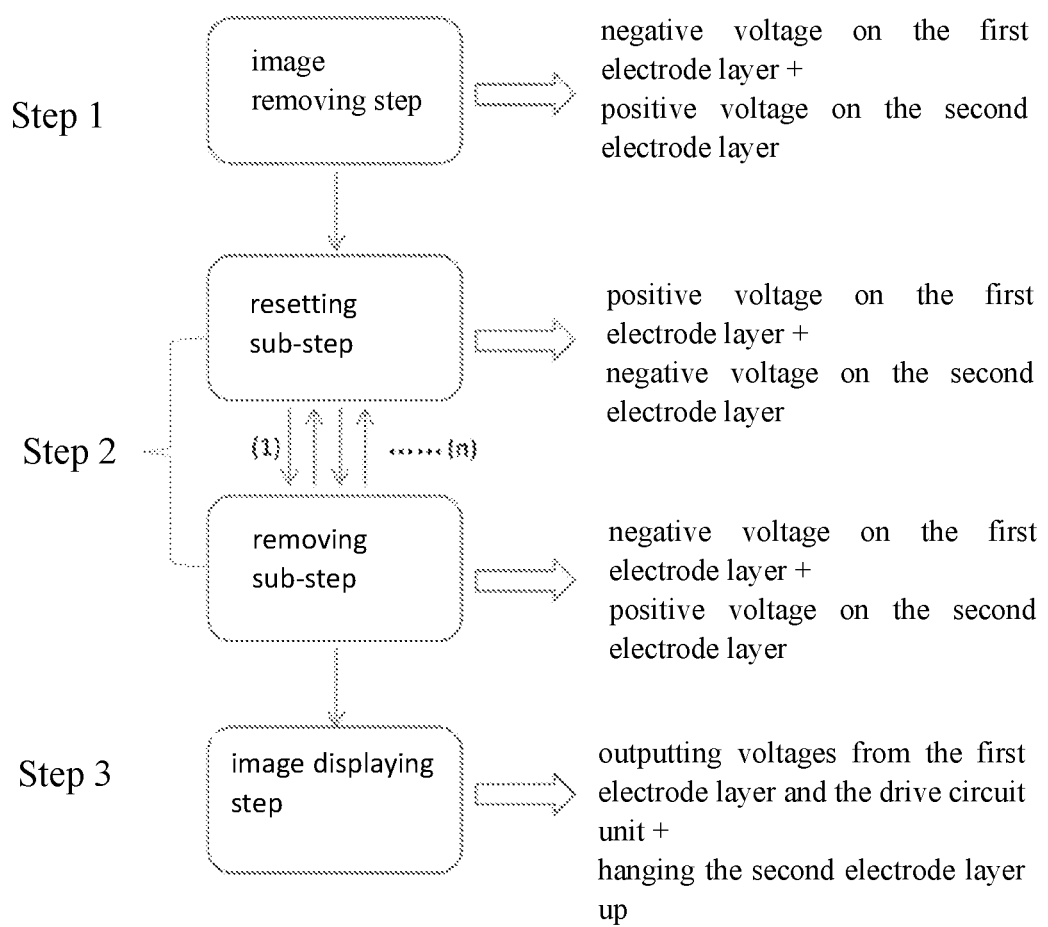
FIG. 3 is a schematic diagram exemplarily illustrating a driving method for driving an electronic paper display apparatus according to one embodiment of this disclosure.

FIG. 3 is a schematic diagram exemplarily illustrating a driving method for driving an electronic paper display apparatus according to one embodiment of this disclosure.

As shown in FIG. 3, the driving method for driving the electronic paper display apparatus according to one embodiment of this disclosure may sequentially comprise the steps of:

step S310, i.e., an image removing step, which comprises applying a negative voltage to the first electrode layer and applying a positive voltage to the second electrode layer;

step S320, i.e., a resetting step, which comprises: a resetting sub-step of applying a positive voltage to the first electrode layer and applying a negative voltage to the second electrode layer; and a removing sub-step of applying a negative voltage to the first electrode layer and applying a positive voltage to the second electrode layer; and step 330, i.e., an image displaying step, which comprises: applying a voltage to the first electrode layer and outputting a voltage to the electronic paper ink layer by the drive circuit unit, wherein the second electrode layer is hanged up. Voltage changes of the thin-film transistor array and the first electrode layer are controlled by the drive circuit unit to allow the electronic paper ink layer to display corresponding images.

The resetting sub-step and the removing sub-step may be each performed once, or may be alternately performed n times, wherein n is 2 to 10, for example 2, 3, 4, 5, 6, 7, 8, 9, or 10.

In the image removing step S310 and/or the resetting step S320, simultaneous entire-face driving is performed by using the first electrode layer and the second electrode layer. At this time, the power output of the drive circuit unit is hanged up and does not work. In the image displaying step S330, it is switched to output signals to a screen pixel by a drive output unit of the drive circuit unit, to allow the second electrode layer to be hanged up and to not work. That is, it is switched to a normal driving mode.

Figure 4:
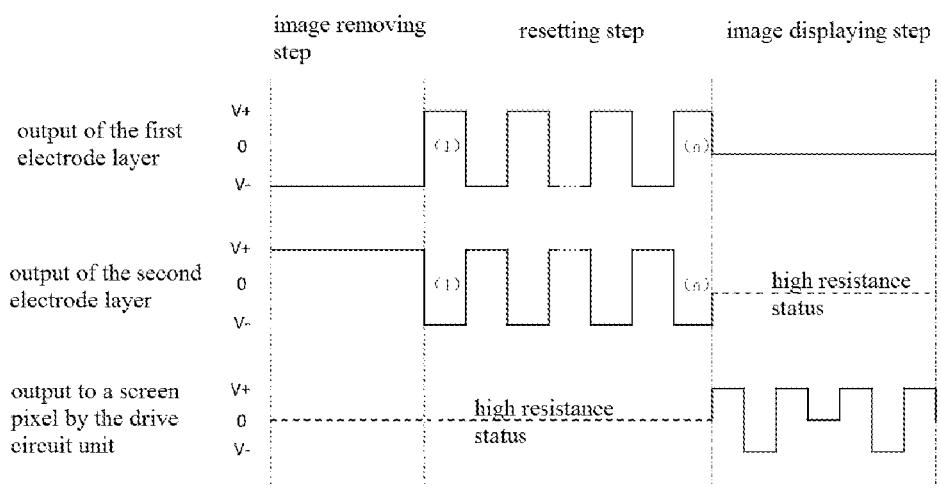
FIG. 4 is a schematic voltage diagram exemplarily illustrating a first electrode layer and a second electrode layer when the driving method as shown in FIG. 3 is implemented.

FIG. 4 is a schematic voltage diagram exemplarily illustrating a first electrode layer and a second electrode layer when the driving method as shown in FIG. 3 is implemented.

As shown in FIG. 4, positive voltages applied to the first electrode layer and the second electrode layer may be, for example 15 volts, respectively. Negative voltages applied to the first electrode layer and the second electrode layer may be, for example −15 volts, respectively. In the image removing step S310 and the resetting step S320, the drive circuit unit is in a high-resistance state. In the image displaying step S330, the second electrode layer is in a high-resistance state.

The resetting step may be performed once, or may be performed n times, wherein n is 2 to 10, for example 2, 3, 4, 5, 6, 7, 8, 9, or 10.

According to this disclosure, by providing the second electrode layer on a side of the thin-film transistor array layer away from the electronic paper ink layer, image refresh time in display may be reduced and energy consumption may be reduced. Specifically, the driving of the first and second electrode layers is controlled by the drive circuit unit, and immediate entire-face driving is performed mainly in the image removing step and/or the resetting step, so as to reduce image refresh time. At the meanwhile, a higher voltage may be applied to the first and second electrodes in the image removing step, so that electrically charged microparticles in electronic paper ink move faster, which may allow refresh time in display to be further reduced. At the meanwhile, there is no need for the drive circuit unit to use large energy consumption to perform line by line scanning driving due to immediate entire-face driving, and therefore energy consumption required by the display module may be reduced to some extent. Whereas, a conventional electronic paper display apparatus uses a line by line scanning mode in the whole stage of driving, and a longer time is required to display a new image.

Both the first electrode layer and the second electrode layer of the electronic paper display apparatus according to this disclosure are connected to the drive circuit unit by using relatively large electrical connection point (for example, a silver paste point may be used as the first electrode layer connection point, and the second electrode layer connection point may have a diameter of 50 μm to 200 μm) and relatively large metal wirings. Therefore, higher voltages may be applied to the first electrode layer and the second electrode layer in the image removing step and the resetting step of driving, so that electrically charged microparticles in electronic paper ink move faster, which may allow refresh time in display to be further reduced.

Additionally, the second electrode layer is formed on the substrate, for example by sputtering, and the insulating layer is formed on the second electrode layer by CVD film-coating. The second electrode layer connection point may be produced together with the second conductive wire from the same material. Therefore, with respect to the production process, the second electrode layer, the insulating layer, the second electrode layer connection point, and the second conductive wire will be easily produced. This is advantageous to the improvement of yield rate, the reduction of energy consumption, and the reduction of cost.

Obviously, various modifications and variations may be made to the examples of this disclosure by the person skilled in the art without deviating from the spirit and the scope of this disclosure. Thus, if these modifications and variations of this disclosure are within the scope of the claims of this disclosure and equivalent techniques thereof, this disclosure also intends to encompass these modifications and variations.

What is claimed is:

1. An electronic paper display apparatus, comprising:
a first electrode layer and a thin-film transistor array layer, which are opposite;
an electronic paper ink layer, which is between the first electrode layer and the thin-film transistor array layer; and
a second electrode layer, which is on a side of the thin-film transistor array layer away from the electronic paper ink layer and is configured to be capable of forming an electric field for removing an image of the electronic paper ink layer or resetting the electronic paper ink layer together with the first electrode layer, wherein the second electrode layer and the first electrode layer are insulated from each other,
an insulating layer, which is between the second electrode layer and the thin-film transistor array layer,
wherein the first electrode layer is electrically connected to a first conductive wire in the thin-film transistor array layer via a first electrode layer connection point, and
wherein the second electrode layer is electrically connected to a second conductive wire in the thin-film transistor array layer via a second electrode layer connection point in the insulating layer.

2. The electronic paper display apparatus according to claim 1, wherein the insulating layer has a thickness of 200 nm to 400 nm.

3. The electronic paper display apparatus according to claim 1, wherein the insulating layer comprises silicon nitride, silicon oxide, or a mixture thereof.

4. The electronic paper display apparatus according to claim 1, wherein the second electrode layer connection point has a diameter of 50 pm to 200 pm.

5. The electronic paper display apparatus according to claim 1, wherein the first electrode layer connection point comprises a gold-bead-containing silica gel or silver paste point.

6. The electronic paper display apparatus according to claim 1, wherein the first electrode layer connection point has a diameter of 0.1 mm to 2 mm.

7. The electronic paper display apparatus according to claim 1, further comprising:
a drive circuit unit, wherein the drive circuit unit is electrically connected to the first electrode layer via the first conductive wire in the thin-film transistor array layer, is electrically connected to the second electrode layer via the second conductive wire in the thin-film transistor array layer, and is electrically connected to a thin-film transistor array in the thin-film transistor array layer via a third conductive wire in the thin-film transistor array layer.

8. The electronic paper display apparatus according to claim 1, wherein the second electrode layer comprises a conductive metal oxide, a metal, or a mixture thereof.

9. The electronic paper display apparatus according to claim 8, wherein the conductive metal oxide is selected from: indium oxide, tin oxide, indium tin oxide, indium zinc oxide, or a mixture of any two or more thereof.

10. The electronic paper display apparatus according to claim 9, wherein the metal is selected from: molybdenum, aluminum, silver, copper, or an alloy or a mixture of any two or more thereof.

11. The electronic paper display apparatus according to claim 1, wherein the second electrode layer has a thickness of 40 nm to 200 nm.

12. A method for producing the electronic paper display apparatus according to claim 1, comprising the steps of:
forming the second electrode layer;
forming the thin-film transistor array layer on the second electrode layer;
forming the electronic paper ink layer on the thin-film transistor array layer; and
forming the first electrode layer on the electronic paper ink layer.

13. The method according to claim 12, further comprising:
forming the insulating layer on the second electrode layer and forming the second electrode layer connection point in the insulating layer, after forming the second electrode layer and before forming the thin-film transistor array layer on the second electrode layer, wherein the second electrode layer is electrically connected to the second conductive wire in the thin-film transistor array layer via the second electrode layer connection point.

14. A method for driving the electronic paper display apparatus according to claim 1, wherein the electric field is formed by applying a first voltage to the first electrode layer and a second voltage to the second electrode layer to remove an image of the electronic paper ink layer or reset the electronic paper ink layer.

15. The method according to claim 14, comprising the steps of:
an image removing step, which comprises applying a negative voltage to the first electrode layer and applying a positive voltage to the second electrode layer.

16. The method according to claim 14, comprising:
a resetting step, which comprises: a resetting sub-step of applying a positive voltage to the first electrode layer and applying a negative voltage to the second electrode layer; and a removing sub-step of applying a negative voltage to the first electrode layer and applying a positive voltage to the second electrode layer.

17. The method according to claim 16, wherein alternately repeating the resetting sub-step and the removing sub-step several times.

18. The method according to claim 14, comprising:
an image displaying step, which comprises: applying a voltage to a pixel electrode via a thin-film transistor array in the thin-film transistor array layer to display an image,
wherein no voltage is applied to the second electrode layer.

* * * * *